(12) United States Patent
Wang et al.

(10) Patent No.: US 11,747,866 B2
(45) Date of Patent: Sep. 5, 2023

(54) HINGE MECHANISM

(71) Applicant: Acer Incorporated, New Taipei (TW)

(72) Inventors: Chuan-Hua Wang, New Taipei (TW);
Wu-Chen Lee, New Taipei (TW);
Cheng-Nan Ling, New Taipei (TW);
Dong-Sheng Wu, New Taipei (TW);
Chih-Chun Liu, New Taipei (TW);
Wen-Chieh Tai, New Taipei (TW);
Yi-Ta Huang, New Taipei (TW)

(73) Assignee: Acer Incorporated, New Taipei (TW)

( * ) Notice: Subject to any disclaimer, the term of this patent is extended or adjusted under 35 U.S.C. 154(b) by 155 days.

(21) Appl. No.: 17/372,546

(22) Filed: Jul. 12, 2021

(65) Prior Publication Data

US 2022/0137674 A1 May 5, 2022

(30) Foreign Application Priority Data

Oct. 30, 2020 (TW) .................................. 109137758

(51) Int. Cl.
*G06F 1/16* (2006.01)
*E05D 11/08* (2006.01)

(52) U.S. Cl.
CPC .......... *G06F 1/1681* (2013.01); *E05D 11/082* (2013.01); *E05Y 2201/214* (2013.01); *E05Y 2201/266* (2013.01); *E05Y 2900/606* (2013.01)

(58) Field of Classification Search
CPC .................. G06F 1/1681; E05D 11/082; E05D 2900/606
See application file for complete search history.

(56) References Cited

U.S. PATENT DOCUMENTS

| 8,424,163 | B2 | 4/2013 | Ahn |
| 9,265,166 | B2* | 2/2016 | Hsu .......................... F16H 25/06 |
| 9,811,123 | B2* | 11/2017 | Park ....................... G06F 1/1681 |
| 9,879,715 | B1* | 1/2018 | Hsu ............................ E05D 7/00 |
| 10,174,535 | B2* | 1/2019 | Lin ........................ G06F 1/1681 |
| 10,253,804 | B2* | 4/2019 | Park ....................... E05D 11/105 |
| 10,294,703 | B2* | 5/2019 | Liu ......................... G06F 1/1681 |
| 10,392,843 | B2* | 8/2019 | Liu ......................... G06F 1/1681 |

(Continued)

FOREIGN PATENT DOCUMENTS

TW            I496999         8/2015

*Primary Examiner* — Victor D Batson
*Assistant Examiner* — Matthew J Sullivan
(74) *Attorney, Agent, or Firm* — JCIPRNET

(57) ABSTRACT

A hinge mechanism includes at least two hinge modules and at least one switching assembly disposed between the adjacent two hinge modules and including a first and second rotating members rotating coaxially with respect to each other. The first rotating member is coaxially disposed at one of the adjacent hinge modules to rotate synchronously. The second rotating member is coaxially disposed at the other one of the adjacent hinge modules to rotate synchronously. The first rotating member has a first driving portion, and the second rotating member has a second driving portion. The first and second driving portions are located on rotating paths of each other, and an idle stroke is provided between the first and second driving portions along the rotating paths. When the first driving portion and the second driving portion pass through the idle stroke, torque forces generated by the adjacent two hinge modules are disconnected.

7 Claims, 7 Drawing Sheets

(56) References Cited

U.S. PATENT DOCUMENTS

| | | | |
|---|---|---|---|
| 10,747,271 B2 * | 8/2020 | Lin | E05D 3/12 |
| 11,163,339 B2 * | 11/2021 | Lin | G06F 1/1618 |
| 11,567,543 B2 * | 1/2023 | Siddiqui | G06F 1/1681 |
| 2005/0044663 A1 * | 3/2005 | Wu | G06F 1/1616 |
| | | | 16/280 |
| 2006/0005356 A1 * | 1/2006 | Amano | H04M 1/0216 |
| | | | 16/341 |
| 2009/0083943 A1 * | 4/2009 | Chen | G06F 1/1681 |
| | | | 16/342 |
| 2009/0100640 A1 * | 4/2009 | Chern, Jr. | G06F 1/1681 |
| | | | 16/277 |
| 2017/0308130 A1 * | 10/2017 | Hsu | G06F 1/1643 |
| 2021/0018960 A1 * | 1/2021 | Kato | G06F 1/1681 |
| 2021/0072800 A1 * | 3/2021 | Lin | G06F 1/1681 |
| 2021/0309030 A1 * | 10/2021 | Zhu | F16C 11/04 |
| 2022/0365570 A1 * | 11/2022 | Hsu | G06F 1/1681 |
| 2022/0365572 A1 * | 11/2022 | Yang | G06F 1/1681 |
| 2022/0377919 A1 * | 11/2022 | Zhang | G06F 1/1681 |

* cited by examiner

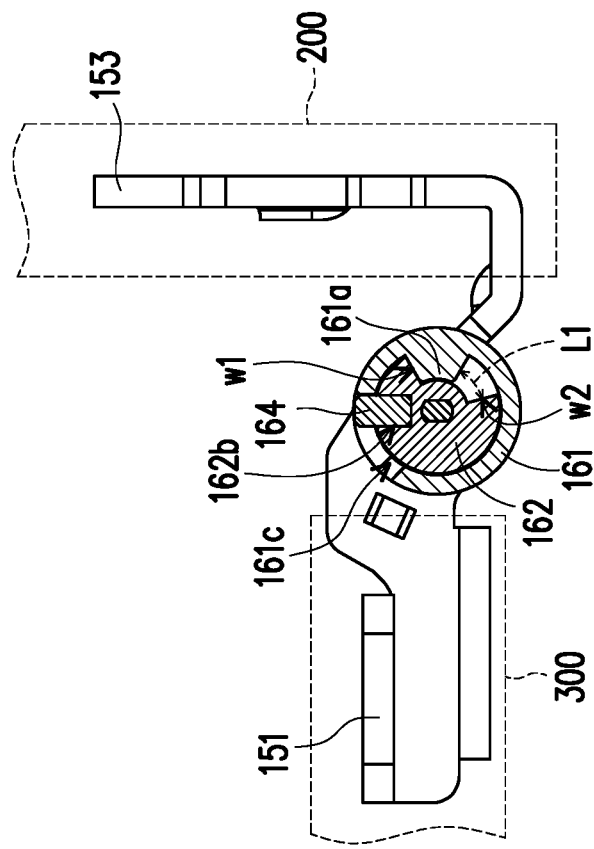
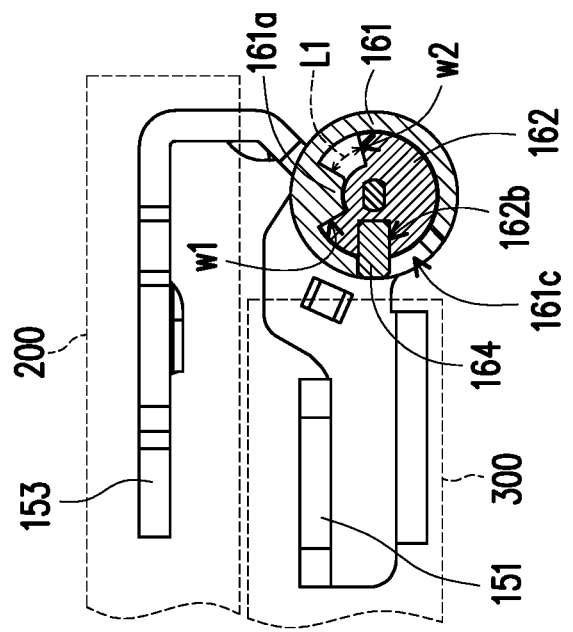
FIG. 3A
FIG. 3B

HINGE MECHANISM

CROSS-REFERENCE TO RELATED APPLICATION

This application claims the priority benefit of Taiwan application serial no. 109137758, filed on Oct. 30, 2020. The entirety of the above-mentioned patent application is hereby incorporated by reference herein and made a part of this specification.

BACKGROUND

Technical Field

The disclosure relates to a hinge mechanism.

Description of Related Art

At present, hinge modules, most of the time, are applied in foldable electronic apparatuses such as notebook computers and the like. The hinge modules are mainly configured to be pivotally connected between two bodies of the foldable electronic apparatuses, such that the bodies may rotate and be unfolded and folded with respect to each other through the hinge modules.

In order to satisfy the trend of light and thin design, the appearance of related members of the foldable electronic apparatuses is required to be reduced; nevertheless, the hinge modules used to support the bodies may not be accordingly reduced in appearance because the hinge modules are required to maintain torque forces of a certain level.

Further, a torque member of a conventional hinge module is formed by a plurality of elastic gaskets and is configured to form the torque force required to support the bodies with its frictional force when the bodies rotate. In a torque member of this type, the generated torque force is determined based on the number of the elastic gaskets, and the torque force value is fixed, so that a user may not further experience a force-saving effect.

SUMMARY

The disclosure provides a hinge mechanism in which a switching assembly is disposed between adjacent two hinge modules to connect or disconnect torque forces generated by the two hinge modules and to provide a user with force-saving operational feel.

A hinge mechanism provided by the disclosure includes at least two hinge modules and at least one switching assembly. The switching assembly is disposed between the adjacent two hinge modules. The switching assembly includes a first rotating member and a second rotating member rotating coaxially with respect to each other. The first rotating member is coaxially disposed at one of the adjacent two hinge modules to rotate synchronously. The second rotating member is coaxially disposed at the other one of the adjacent two hinge modules to rotate synchronously. The first rotating member has a first driving portion, and the second rotating member has a second driving portion. The first driving portion and the second driving portion are located on rotating paths of each other, and an idle stroke is provided between the first driving portion and the second driving portion along the rotating paths. When the first rotating member and the second rotating member rotate with respect to each other and the first driving portion and the second driving portion pass through the idle stroke, the torque forces generated by the adjacent two hinge modules are disconnected.

To sum up, in the hinge mechanism, the switching assembly is disposed between adjacent two hinge modules. The switching assembly includes the first rotating member and the second rotating member rotating coaxially with respect to each other. The first rotating member is coaxially linked to one of the hinge modules, and the second rotating member is coaxially linked to the other one of the hinge modules. Further, each of the first rotating member and the second rotating member has the driving portion located on the rotating path of each other. The idle stroke in which the driving portions do not drive each other is provided on the rotating paths. Accordingly, when the first rotating member and the second rotating member rotate with respect to each other and the first driving portion and the second driving portion pass through the idle stroke, the torque forces generated by the adjacent two hinge modules are disconnected. In contrast, when the first rotating member and the second rotating member rotate with respect to each other but the first driving portion and the second driving portion do not pass through the idle stroke, the driving portions the first rotating member and the second rotating member may drive each other and rotate. That is, the torque forces generated by the first hinge module and the second hinge module are connected. Through the switching assembly, the torque forces generated by the hinge modules may be switched between different states, so that the user is provided with force-saving operational feel.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

FIG. 3A to FIG. 3C are cross-sectional views illustrating a portion of the hinge mechanism in different states.

DESCRIPTION OF THE EMBODIMENTS

Figure 1:
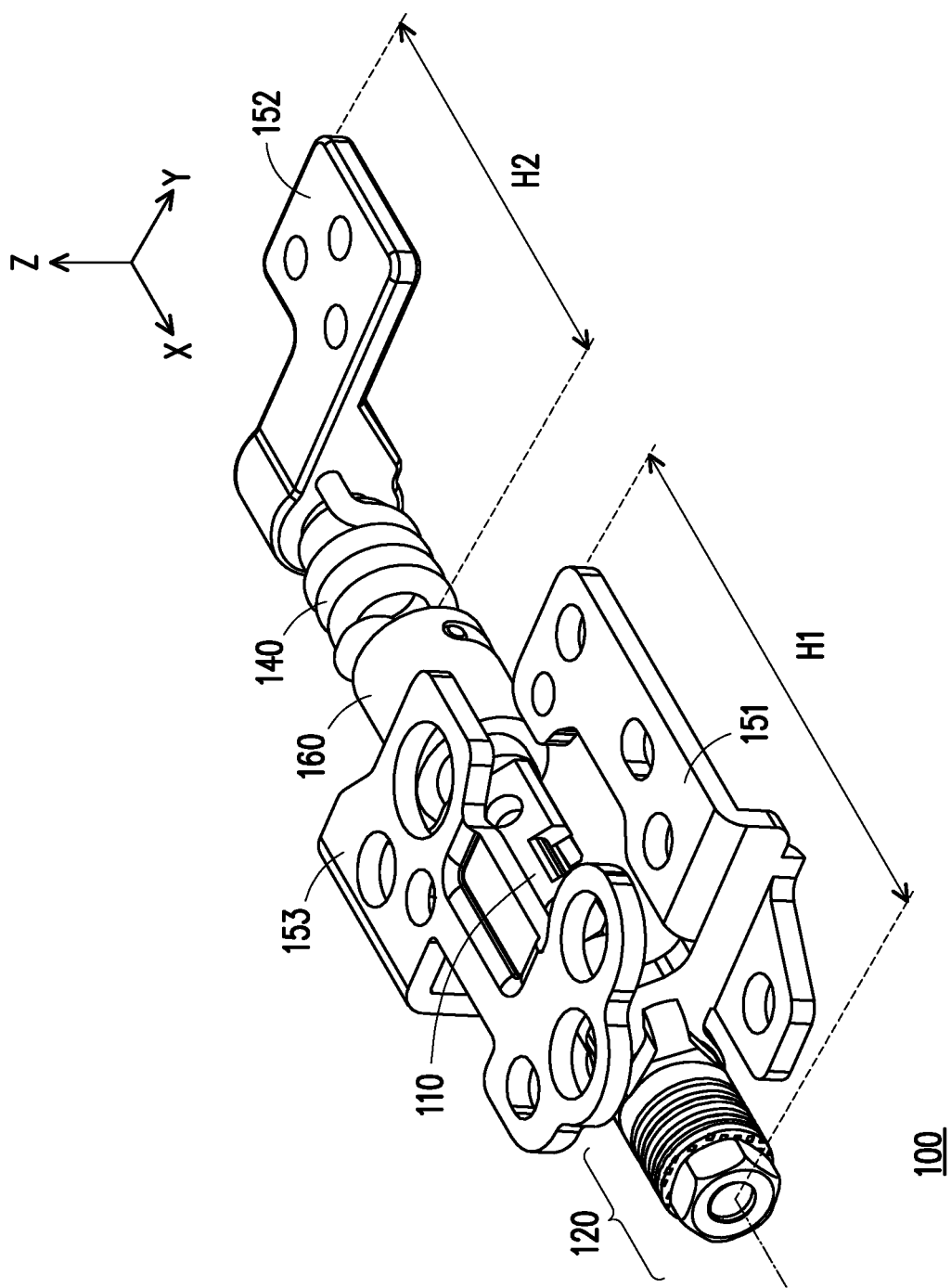
FIG. 1 is a schematic view of a hinge mechanism according to an embodiment of the disclosure.
Figure 2A:
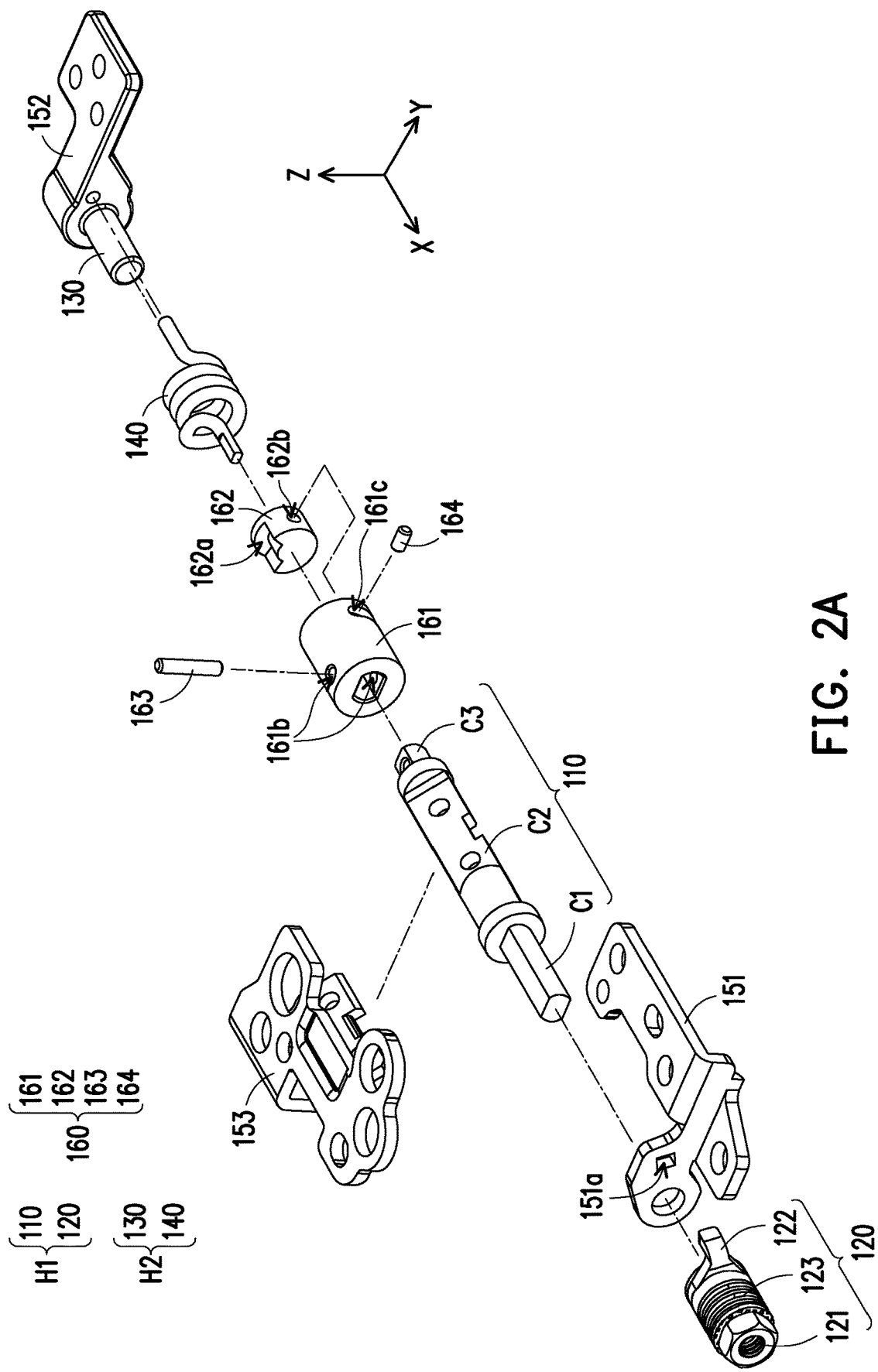
FIG. 2A and FIG. 2B are exploded views illustrating the hinge mechanism of FIG. 1 from different viewing angles.
Figure 2B:
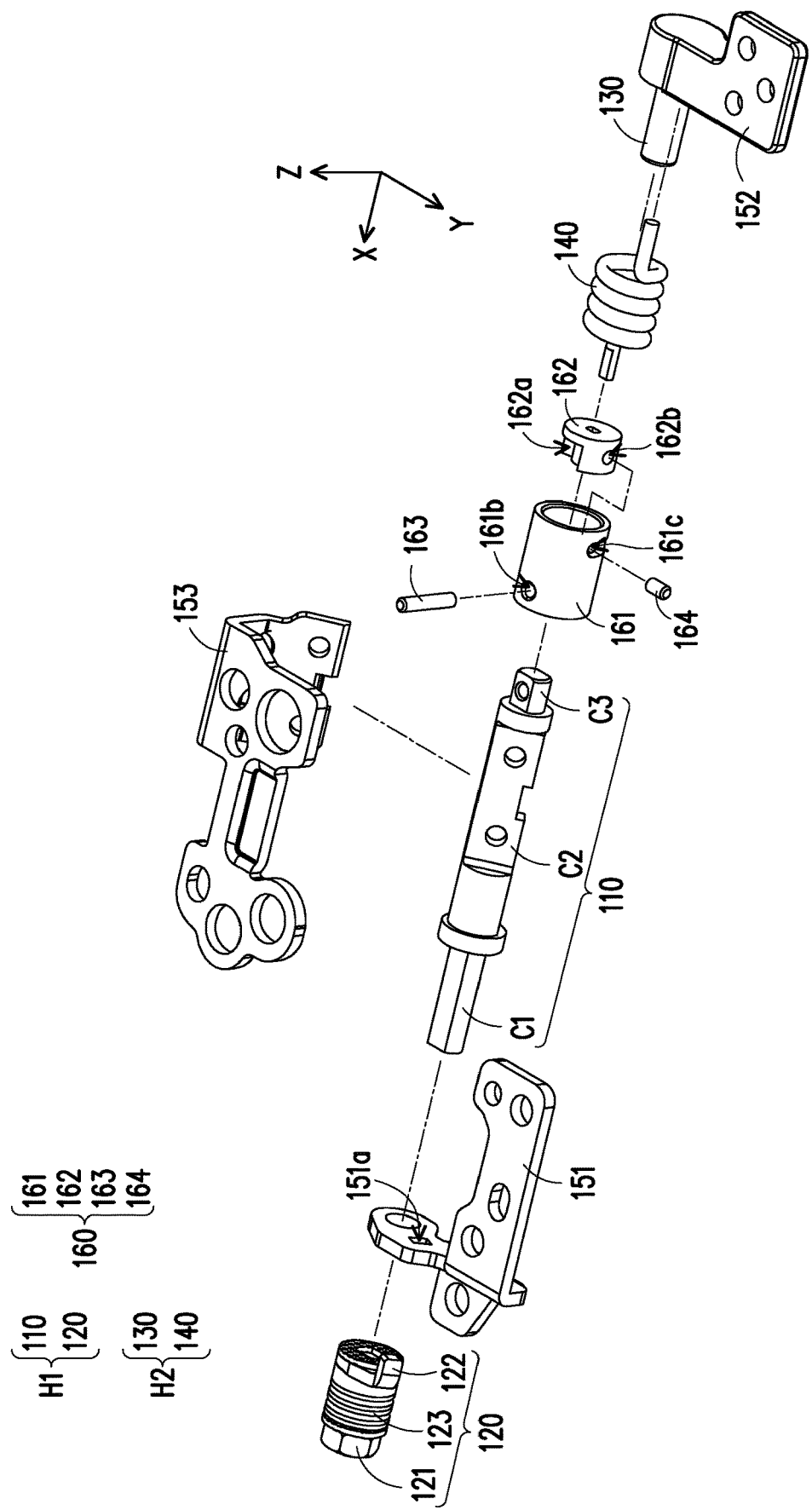

FIG. 1 is a schematic view of a hinge mechanism according to an embodiment of the disclosure. FIG. 2A and FIG. 2B are exploded views illustrating the hinge mechanism of FIG. 1 from different viewing angles. A Cartesian coordinate system X-Y-Z is provided herein for ease of description of members. With reference to FIG. 1, FIG. 2A, and FIG. 2B together, a hinge mechanism 100 provided by the disclosure includes at least two hinge modules and at least one switching assembly, and the at least one switching assembly is disposed between the adjacent at least two hinge modules. In this embodiment, a switching assembly 160 adjacent between a first hinge module H1 and a second hinge module H2 is taken as an example herein. In this embodiment, the switching assembly 160 includes a first rotating member 161 and a second rotating member 162 rotating coaxially with respect to each other. The first rotating member 161 is coaxially disposed at one of the adjacent two hinge modules (i.e., the first hinge module H1) to rotate synchronously. The second rotating member 162 is coaxially disposed at the other one of the adjacent two hinge modules (i.e., the second hinge module H2) to rotate synchronously. An axis provided in the disclosure refers to the X axis.

Figure 2C:
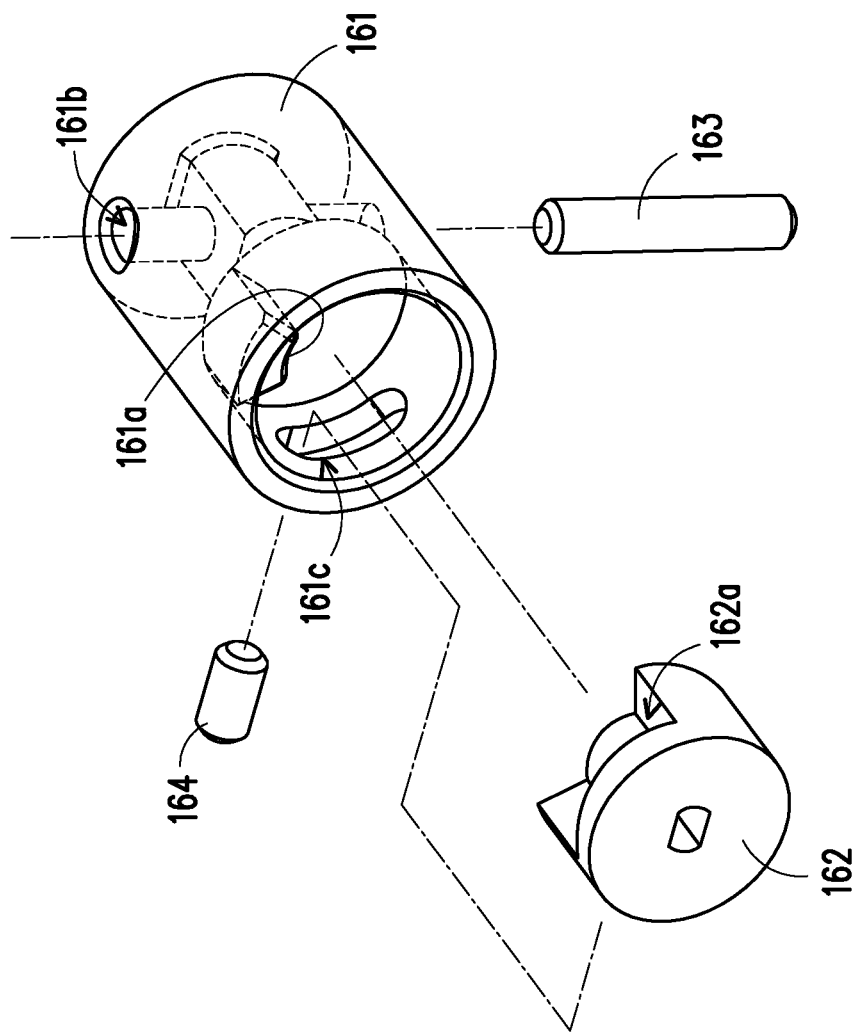
FIG. 2C is an exploded view of a switching assembly.

FIG. 2C is an exploded view of a switching assembly. With reference to FIG. 2A to FIG. 2C together, in this embodiment, the hinge mechanism 100 further includes a first bracket 151, a second bracket 152, and a third bracket 153. The first hinge module H1 includes a shaft body 110 and a torque assembly 120, and the shaft body 110 is divided into three adjacent sections C1, C2, and C3. The torque assembly 120 includes a fixing member 122, a locking member 121, and a torque member 123. After being inserted in the first bracket 151, the fixing member 122, and the torque member 123, the section C1 is locked together with the locking member 121. An end of the fixing member 122 extends and is embedded in a fixing hole 151a of the first bracket 151. The third bracket 153 is assembled to the section C2 of the shaft body 110, and the section C3 is assembled to the first rotating member 161. The second hinge module H2 includes a shaft body 130 and a torque member 140. The second bracket 152 and the shaft body 130 are assembled together. The torque member 140 is sleeved on the shaft body 130, and opposite ends of the torque member 140 are fixed to the second bracket 152 and the second rotating member 162.

In other words, as shown in FIG. 1, FIG. 2A, and FIG. 2B, the first hinge module H1, the switching assembly 160, and the second hinge module H2 are coaxially connected between the first bracket 151 and the second bracket 152 in sequence. In this way, the first hinge module H1, the switching assembly 160, and the second hinge module H2 may be treated as single-axis (all along the X axis) members. When the hinge mechanism 100 is applied to two bodies of a foldable electronic apparatus, the third bracket 153 is assembled to one body, and the first bracket 151 and the second bracket 152 are assembled to the other body together. That is, the first bracket 151 and the second bracket 152 are assembled to a same structural body. Accordingly, through the above member assembly relationship, the first bracket 151 and the third bracket 153 rotate with respect to each other through the first hinge module H1, and the second bracket 152 and the third bracket 153 rotate with respect to each other through the first hinge module H1 and the second hinge module H2. The switching assembly 160 provides a required switching effect to connect or disconnect torque forces generated by the first hinge module H1 and the second hinge module H2|.

Further, the first rotating member 161 has a first driving portion 161a, and the second rotating member 162 has a second driving portion 162a. The first driving portion 161a and the second driving portion 162a are located on rotating paths of each other, and an idle stroke is provided between the first driving portion 161a and the second driving portion 162a along the rotating paths. When the first driving portion 161a and the second driving portion 162a pass through the idle stroke, the torque forces generated by the adjacent two hinge modules H1 and H2 are disconnected, and description thereof is provided in later paragraphs.

With reference to FIG. 2A to FIG. 2C, in this embodiment, the first rotating member 161 and the second rotating member 162 provided in this embodiment are coaxially (along the X axis) coupled to a pair of cams. As shown in FIG. 2C, the first driving portion 161a and the second driving portion 162a are a convex portion and a concave portion of the pair of cams at a coupling position. To be specific, the first rotating member 161 and the second rotating member 162 are a rotating sleeve (the first rotating member 161) and a rotor (the second rotating member 162) coaxially disposed with each other, and the rotor may be rotatably embedded in the rotating sleeve along the X axis.

Further, the switching assembly 160 of the hinge mechanism 100 further includes a fixing pin 163 and a positioning pin 164. After the section C3 of the shaft body 110 is inserted in the first rotating member 161, the fixing pin 163 may penetrate an insertion hole 161b, and the first rotating member 161 and the section C3 are thereby fixed. As shown in FIG. 2A and FIG. 2B, one end of the torque member 140 is securely connected to the second bracket 152, and the other end is coaxially and securely connected to the second rotating member 162 along the X axis. Next, the positioning pin 164 is inserted in a reamed hole 161c of the first rotating member 161 and thus is fixed to an insertion hole 162b of the second rotating member 162. In this way, when the second rotating member 162 rotates with respect to the first rotating member 161 along the X axis, the positioning pin 164 may move in the reamed hole 161c and thus provides a positioning effect.

Figure 3C:
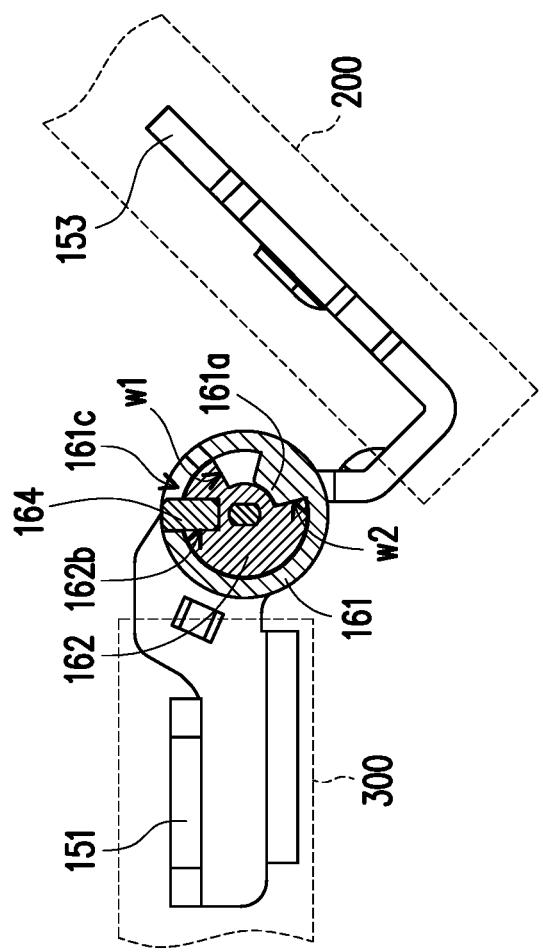

FIG. 3A to FIG. 3C are cross-sectional views illustrating a portion of the hinge mechanism in different states. With reference to FIG. 3A first together with FIG. 2A to FIG. 2C, in this embodiment, the first driving portion 161a of the first rotating member 161 is, for example, a convex portion located in the rotating sleeve, the second driving portion 162a of the second rotating member 162 is, for example, a concave portion, and the convex portion and the concave portion are located on rotating paths of each other. As shown in FIG. 3A, the second driving portion 162a substantially includes side walls w1 and w2 forming two sides of the concave portion, and the convex portion is rotatably coupled into the concave portion. In the state shown in FIG. 3A, an idle stroke L1 is provided between the convex portion and the side wall w2 of the concave portion.

With reference to FIG. 3A to FIG. 3C together, two bodies 200 and 300 of the foldable electronic apparatus are also provided herein, and in this way, rotating, unfolded, and folded states of the bodies 200 and 300 caused by the hinge mechanism 100 may thus be clearly understood. In this embodiment, the state shown in FIG. 3A is, for example, a first state in which the foldable electronic apparatus is folded (an unfolding angle is regarded as 0 degrees), and the body 200 is on top of the body 300 at this time. The state shown in FIG. 3B is, for example, a second state in which the foldable electronic apparatus is unfolded, and at this time, the bodies 200 and 300 rotate with respect to each other and are unfolded to a first angle (as shown in FIG. 3B, an unfolding angle is 90 degrees) through the hinge mechanism 100. The state shown in FIG. 3C is, for example, a third state in which the foldable electronic apparatus is unfolded, and at this time, the bodies 200 and 300 may rotate with respect to each other and continue to be unfolded to a second angle (as shown in FIG. 3C, the unfolding angle is 135 degrees) through the hinge mechanism 100. Note that a user may accordingly operate and set the bodies 200 and 300 to be kept in any angle state between the second state and the third state.

Moreover, as shown in FIG. 1, FIG. 2A, and FIG. 2B, the first hinge module H1 and the second hinge module H2 respectively have the torque members 123 and 140. The torque member 123 is configured to provide a first torque force, and the torque member 140 is, for example, a torsion spring and is configured to provide a second torque force. Through the switching assembly 160, the first torque force and the second torque force may be connected or disconnected. Accordingly, in the hinge mechanism 100 provided by the present embodiment, the torsion spring (the torque member 140) in the first state as shown in FIG. 3A may be designed to be in a deformation state. That is, the torque member 140 in the folded foldable electronic apparatus is allowed to accumulate the second torque force, which may further serve as an auxiliary force for the user when unfolding the bodies 200 and 300. That is, the second torque force provided by the second hinge module H2 may be used by the hinge mechanism 100 when being converted from the first state to the structural body, and a force-saving effect may thus be achieved.

In the process from FIG. 3A to FIG. 3B, the second torque force provided by the second hinge module H2 drives the shaft body 130 to rotate, meaning that the rotor (the second rotating member 162) of the switching assembly 160 may rotate along with the shaft body 130. Further, in the first state shown in FIG. 3A, the side wall w1 is abutted against the first driving portion 161a. As such, when the second rotating member 162 clockwise rotates along the X axis as shown in FIG. 3A to FIG. 3B, the first rotating member 161 is also driven to synchronously rotate to the state shown in FIG. 3B in a same direction. Herein, it can be clearly seen that from the member relationship as shown in FIG. 2A and FIG. 2B, when the first rotating member 161 rotates, the shaft body 110 of the first hinge module H1 is also driven to synchronously rotate in the same direction, so that the third bracket 153 is driven to the second state shown in FIG. 3B. In other words, the second state shown in FIG. 3B may be treated as the second torque force provided by the second hinge module H2 and as an initial unfolding angle after the bodies 200 and 300 are unfolded from the folded state shown in FIG. 3A; alternatively, may be treated as a predetermined angle for the bodies 200 and 300 of the foldable electronic apparatus when the bodies 200 and 300 are to be initially unfolded from the folded state.

In this embodiment, the second torque force is substantially greater than the first torque force. Further, in the rotation process from FIG. 3A to FIG. 3B, the switching assembly 160 still sets the first torque force and the second torque force to be connected. That is, it means that in the process of converting from FIG. 3A to FIG. 3B, the first torque force is sufficient to overcome the second torque force to achieve the state shown in FIG. 3B. That is, the force of the first torque force exceeding the second torque force drives the hinge mechanism 100 (and the body 200) to rotate from the first angle in FIG. 3A to the second angle in FIG. 3B. In the second state shown in FIG. 3B, it means that a first torque force value is equal to a sum of a weight of the body 200 and the first torque force value. The torque force value and the unfolding angle are not particularly limited herein, and a corresponding torque design may also be provided according to needs to achieve operational feel of "gentle unfolding" required in FIG. 3A to FIG. 3B.

Next, when the user continues to rotate and unfold the bodies 200 and 300 with respect to each other, for instance, the user applies a force to the body 200 (and the third bracket 153) such that the body 200 is converted from the second state to the third state as shown from FIG. 3B to FIG. 3C, the first driving portion 161a may rotate based on the idle stroke L1. As shown in the process, when rotation is performed based on the idle stroke L1, the second rotating member 162 does not rotate along with the first rotating member 161. It means that the second hinge module H2 and the generated second torque force are disconnected to the first hinge module H1 and the generated first torque force. In other words, in the process from the second state (FIG. 3B) to the third state (FIG. 3C), only the torque member 123 of the first hinge module H1 provides the required first torque force to support the body 200. Further, the first torque force may support the body 200 to be kept in any unfolded state between the second state and the third state.

Figure 4:
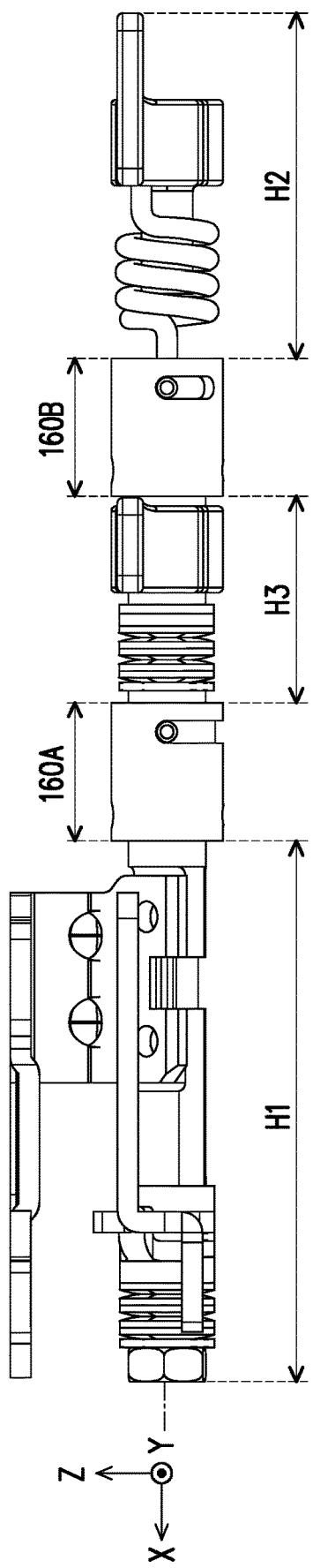
FIG. 4 is a schematic view illustrating a hinge mechanism according to another embodiment of the disclosure.

FIG. 4 is a schematic view illustrating a hinge mechanism according to another embodiment of the disclosure. With reference to FIG. 4, different from the foregoing embodiments, the hinge mechanism provided by this embodiment includes a first hinge module H1, a second hinge module H2, a third hinge module H3, a switching assembly 160A adjacent between the first hinge module H1 and the third hinge module H3, and a switching assembly 160B adjacent between the second hinge module H2 and the third hinge module H3. The first hinge module H1 and the second hinge module H2 are same as those provided in the foregoing embodiment. The third hinge module H3 has a torque member 123 similar to that of the first hinge module H1. The switching assemblies 160A and 160B are similar to the switching assembly 160 provided in the foregoing embodiments. The difference therebetween is that rotating strokes corresponding to the first rotating member 161 and the second rotating member 162 are different and are correspondingly adjusted according to required conditions.

According to the above embodiments, it may be deduced that the hinge mechanism provided by this embodiment may provide four different states. The first state and the second state are shown in FIG. 3A and FIG. 3B. The second torque force provided by the second hinge module H2 may accordingly convert the foldable electronic apparatus from the folded first state to the unfolded second state. Next, the switching assembly 160B disconnects the second hinge module H2 (and the generated torque force) from the third hinge module H3 and the first hinge module H1. At this time, the switching assembly 160A is still connected to the first hinge module H1 and the second hinge module H2. In this way, the hinge mechanism in a state similar to the second state shown in FIG. 3B may then be driven to the third state through a force applied by the user and is kept in any state between the second state and the third state. Finally, the switching assembly 160A disconnects the first hinge module H1 from the third hinge module H3, such that the user may drive the hinge mechanism to be converted from the third state to the fourth state and is kept in any state between the third state and the fourth state. As described above, a rotating angle is not particularly limited in this disclosure, and torque forces of the first hinge module H1, the second hinge module H2, and the third hinge module H3 may be appropriately adjusted according to needs, such that the effects shown from the first state to the fourth state may be obtained.

For instance, the hinge mechanism provided by this embodiment may be converted from the folded state (such as the above-mentioned 0 degrees) to the second state (such as the above-mentioned 90 degrees), converted to the third state (such as the above-mentioned 135 degrees) next, and then converted to the fourth state (such as the above-mentioned 180 degrees). That is, in the conversion process from being folded (the first state) to be completely unfolded (the fourth state), the connection relationship between the second hinge module H2 and the third hinge module H3 are gradually lifted.

It may be clearly seen from the present embodiment and the foregoing embodiments that in the disclosure, the required folded/unfolded state may be achieved through the plurality of hinge modules, the plurality of switching assemblies, and the plurality of brackets. That is, any switching assembly may be configured to be connected between any two adjacent hinge modules, one bracket is disposed at the structural body (e.g., the body 200), and the remaining brackets are disposed at the other structural body (e.g., the body 300) and are arranged along the X axis. Further, the hinge modules and the switching assemblies are spaced apart and coaxially connected between front positions and end positions of the remaining brackets in sequence. In this way, the required state may be achieved through the member arrange and corresponding relationship between the hinge modules and the switching assembly provided in the foregoing embodiments.

In view of the foregoing, in the hinge mechanism provided by the embodiments of the disclosure, the switching assembly is disposed between adjacent two hinge modules. The switching assembly includes the first rotating member and the second rotating member rotating coaxially with respect to each other. The first rotating member is coaxially linked to one of the hinge modules, and the second rotating member is coaxially linked to the other one of the hinge modules. Further, each of the first rotating member and the second rotating member has the driving portion located on the rotating path of each other. The idle stroke in which the driving portions do not drive each other is provided on the rotating paths. Accordingly, when the first rotating member and the second rotating member rotate with respect to each other and the first driving portion and the second driving portion pass through the idle stroke, the torque forces generated by the adjacent two hinge modules are disconnected. In contrast, when the first rotating member and the second rotating member rotate with respect to each other but the first driving portion and the second driving portion do not pass through the idle stroke, the driving portions the first rotating member and the second rotating member may drive each other and rotate. That is, the torque forces generated by the first hinge module and the second hinge module are connected. Through the switching assembly, the torque forces generated by the hinge modules may be switched between different states, so that the user is provided with force-saving operational feel.

Based on the above, it may be further inferred that in the hinge mechanism, when plural hinge modules and plural switching assemblies are provided and connected in series, the torque forces may be provided in stages. In short, plural hinge modules and plural switching assemblies are provided, and one switching assembly is set to be adjacent between adjacent two hinge modules. In this way, through the torque force design of the torque members, when the hinge mechanism rotates (equivalent to that when the foldable electronic apparatus is unfolded or folded), the effect which requires the torque forces to be provided in stages is achieved.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A hinge mechanism, comprising:
   at least two hinge modules disposed on a same rotating axis; and
   at least one switching assembly, disposed between the adjacent at least two hinge modules, wherein the at least one switching assembly comprises a first rotating member and a second rotating member rotating coaxially and about the rotating axis with respect to each other, the first rotating member is coaxially disposed at one of the adjacent at least two hinge modules to rotate about the rotating axis synchronously, and the second rotating member is coaxially disposed at the other one of the adjacent at least two hinge modules to rotate about the rotating axis synchronously,
   wherein the first rotating member and the second rotating member respectively are a rotating sleeve and a rotor, the rotor is inserted into the rotating sleeve, and a convex portion of the rotating sleeve is inserted and coupled to a concave portion of the rotor,
   wherein the rotor and the rotating sleeve are rotated relatively about the rotating axis and the convex portion and the concave portion are located on a same rotating path,
   wherein an idle stroke is provided between the convex portion and the concave portion along the rotating path,
   wherein when the first rotating member and the second rotating member rotate about the rotating axis with respect to each other and the convex portion and the concave portion pass through the idle stroke, a torque force generated by one of the adjacent at least two hinge modules is not transmitted to the other through the switching assembly,
   wherein the at least one switching assembly further comprises a fixing pin, each of the at least two hinge modules comprises a shaft body and a torque member, and in the adjacent at least two hinge modules, the shaft body of one of the at least two hinge modules passes through the fixing pin to be fixed together with the rotating sleeve, and two opposite ends of the torque member of the other one of the at least two hinge modules is connected between the shaft body of the other one of the at least two hinge modules and the rotor.

2. The hinge mechanism according to claim 1, further comprising a positioning pin, fixed to the rotor and movably inserted in a reamed hole of the rotating sleeve.

3. The hinge mechanism according to claim 1, wherein the adjacent at least two hinge modules comprise a first hinge module and a second hinge module, the hinge mechanism further comprises a first bracket, a second bracket, and a third bracket, the first bracket and the third bracket rotate with respect to each other through the first hinge module, and the second bracket and the third bracket rotate with respect to each other through the first hinge module and the second hinge module.

4. The hinge mechanism according to claim 3, wherein the first bracket, the first hinge module, the at least one switching assembly, and the second hinge module, and the second bracket are coaxially connected on the rotating axis in sequence.

5. The hinge mechanism according to claim 3, wherein the hinge mechanism is assembled to two bodies of a foldable electronic apparatus, the third bracket is assembled to one of the two bodies, and the first bracket and the second bracket are assembled to the other.

6. The hinge mechanism according to claim 3, wherein the first hinge module provides a first torque force, the second hinge module provides a second torque force, the second torque force converts the hinge mechanism from a first state to a second state, the first torque force is configured to keep the hinge mechanism to be in any state between the second state and a third state, and the convex portion and the concave portion pass through the idle stroke between the second state and the third state, such that the first torque force and the second torque force are not transmitted to each other through the switching assembly.

7. The hinge mechanism according to claim 1, comprising a plurality of the hinge modules, a plurality of the switching assemblies, and a plurality of brackets, wherein any one of the switching assemblies is connected between adjacent two hinge modules, one of the brackets is disposed in a structural body, and the remaining brackets are disposed on the other structural body and are arranged along an axis, wherein the hinge modules and the switching assemblies are spaced apart and coaxially connected between front positions and end positions of the remaining brackets in sequence.

* * * * *